United States Patent
Yu

(10) Patent No.: US 9,306,217 B2
(45) Date of Patent: Apr. 5, 2016

(54) MESOPOROUS CARBON STRUCTURES, PREPARATION METHOD THEREOF AND LITHIUM SECONDARY BATTERY INCLUDING THE SAME

(71) Applicant: KOREA UNIVERSITY RESEARCH AND BUSINESS FOUNDATION, Seoul (KR)

(72) Inventor: Jong-Sung Yu, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 92 days.

(21) Appl. No.: 13/867,735

(22) Filed: Apr. 22, 2013

(65) Prior Publication Data

US 2014/0099553 A1      Apr. 10, 2014

(30) Foreign Application Priority Data

Oct. 9, 2012    (KR) ........................ 10-2012-0112057

(51) Int. Cl.
```
C01B 31/02      (2006.01)
H01M 4/583      (2010.01)
H01M 4/133      (2010.01)
H01M 10/0525    (2010.01)
```

(52) U.S. Cl.
CPC ............ *H01M 4/583* (2013.01); *C01B 31/02* (2013.01); *H01M 4/133* (2013.01); *H01M 10/0525* (2013.01); *Y02E 60/122* (2013.01)

(58) Field of Classification Search
CPC ....... C01B 31/02; H01M 4/133; H01M 4/533

USPC ............................................. 423/445 R, 460
See application file for complete search history.

(56) References Cited

FOREIGN PATENT DOCUMENTS

KR      10-2012-0105823 A      9/2012

OTHER PUBLICATIONS

Mesoporous Carbon/Zirconia Composites: A Potential Route to Chemically Functionalized Electrically-Conductive Mesoporous Materials Jung-Min Oh, Amar S. Kumbhar, Olt Geiculescu, and Stephen E. Creager Langmuir 2012 28 (6), 3259-3270.*

Meng, Yan, et al. "Ordered mesoporous polymers and homologous carbon frameworks: amphiphilic surfactant templating and direct transformation." Angewandte Chemie 117.43 (2005): 7215-7221.*

Jun, Shinae, et al. "Synthesis of new, nanoporous carbon with hexagonally ordered mesostructure." Journal of the American Chemical Society 122.43 (2000): 10712-10713.*

Wang, Y. et al., *Synthesis of Length Controllable Mesoporous SBA-15 Rods*, Materials Chemistry and Physics 115 (2009) 649-655.

* cited by examiner

*Primary Examiner* — Richard M Rump
(74) *Attorney, Agent, or Firm* — Alston & Bird LLP

(57) ABSTRACT

Provided are mesoporous carbon structures and a method for preparing the same. The mesoporous carbon structures have a high surface area, a large pore volume and a large pore size in addition to a small mesopore length. Therefore, when using the mesoporous carbon structures as an anode active material for a lithium secondary battery, it is possible to provide a lithium secondary battery with excellent lithium ion storability and charge/discharge efficiency.

13 Claims, 6 Drawing Sheets

MESOPOROUS CARBON STRUCTURES, PREPARATION METHOD THEREOF AND LITHIUM SECONDARY BATTERY INCLUDING THE SAME

CROSS-REFERENCE TO RELATED APPLICATIONS

This application claims priority under 35 U.S.C.§119 to Korean Patent Application No. 10-2012-0112057, filed on Oct. 9, 2012, in the Korean Intellectual Property Office, the disclosure of which is incorporated herein by reference in its entirety.

TECHNICAL FIELD

The following disclosure relates to mesoporous carbon structures. More particularly, the following disclosure relates to mesoporous carbon structures having a high surface area, large pore volume and a large pore size, and showing excellent mass transferability to improve the capacity and efficiency of a lithium secondary battery, as well as to a method for preparing the same.

BACKGROUND

As semiconductor industry has been developed significantly, the generation of information communication having a new communication paradigm, in which multimedia functions of compact electric/electronic appliances, such as notebook computers, cellular phones, DMB phones or portable communication systems based on bidirectional communication are generalized instead of simple information reception, has been come.

Since graphite-based secondary batteries appeared in the market, the energy density of a battery has undergone rapid development and reached two times or higher of the energy density of the early time of its development. However, there has been a continuous need for a high-capacity battery. Particularly, there is an imminent need for developing an anode material having excellent high-rate charge/discharge characteristics. Because the capacity of a battery depends on the charge/discharge characteristics of an anode material, improvement of an anode active material has been given many attentions in many battery developers.

Many studies have been conducted to date about using a graphite-based carbonaceous material as an anode material for lithium ion secondary batteries. However, in the case of a graphite-based carbonaceous material, it still needs improvement in terms of a charge/discharge rate so that it is applied to vehicles, such as hybrid cars, although it may be provided with high energy density per unit volume. Meanwhile, a lithium ion secondary battery using an amorphous carbonaceous material has a large irreversible capacity and low energy density per unit volume. Therefore, many attempts have been made to develop a porous carbonaceous material having a high energy density and efficiency.

Meanwhile, porous materials are classified into microporous materials (2 nm or less), mesoporous materials (2-50 nm) and macroporous materials (50 nm or more), depending on pore diameters. In addition, such porous materials may be applied to various industrial fields, including catalysts, separation systems, low-dielectric constant materials, hydrogen storage materials and photonics crystals, by controlling pore sizes and distributions and surface areas. Thus, such porous materials have been given many attentions in the art.

Porous materials include inorganic materials, metals, polymers and carbon. Among those, carbon has excellent chemical, mechanical and thermal stability, is economical, is applicable to various uses, and has excellent surface characteristics, ion conductivity and electron conductivity. Therefore, active studies have been conducted about porous carbonaceous materials having excellent lithium ion storability even in high-rate charge/discharge cycles and realizing a high energy density per unit volume. However, there is a problem in that it is difficult to provide a carbonaceous material showing excellent porous characteristics through well-developed pores while still maintaining a high surface area.

SUMMARY

An embodiment of the present disclosure is directed to providing mesoporous carbon structures having a high surface area, large pore volume and a large pore size and showing excellent mass transferability. Another embodiment of the present disclosure is directed to providing a method for preparing the mesoporous carbon structures. Still another embodiment of the present disclosure is directed to providing a lithium ion secondary battery having excellent lithium ion storability and capable of maintaining its capacity during high-rate charge/discharge cycles by using the mesoporous carbon structures as an anode material.

In one general aspect, there are provided mesoporous carbon structures including a plurality of linear fibrous carbon structures ordered in a polygonal array, wherein pores are formed among the linear fibrous carbon structures while being spaced apart from each other by 1.0-50 nm, and the pores are three-dimensionally interconnected.

According to an embodiment, the mesoporous carbon structures may have a rod-like shape or a thin plate-like shape with a more compact structure. Optionally, the mesoporous carbon structures may have a spherical shape or may be amorphous one having no defined shape.

According to another embodiment, the mesoporous carbon structures may have a length of 0.1-4.0 μm, diameter of 100-2500 nm, BET surface area of 500-3000 $m^2/g$, and a total pore volume of 0.80-3.80 $cm^3/g$.

In another aspect, there are provided an anode active material for a lithium secondary battery, including the mesoporous carbon structures, and a lithium secondary battery including the anode active material.

In still another aspect, there is provided a method for preparing the mesoporous carbon structures, including the steps of:

(a) providing a plurality of cylindrical channels each having a diameter of 1.0-50 nm and a mesoporous silica template in which the cylindrical channels are ordered in a polygonal array;

(b) forming mesoporous carbon structures by using the mesoporous silica template; and (c) removing the silica template after forming the mesoporous carbon structures.

According to an embodiment, step (a) may be carried out through a hydrothermal reaction. In addition, when an acid is added to the hydrothermal reaction, the resultant mesoporous silica template may have a rod-like shape.

According to another embodiment, the acid may be any one selected from the group consisting of hydrochloric acid, sulfuric acid, nitric acid and phosphoric acid, and the mesoporous silica template may have a mesopore length controlled by adjusting the concentration of acid.

According to still another embodiment, the concentration of acid may be controlled within a range of 0.1-4.0M. As the concentration of acid increases, the length of the resultant rod-like mesoporous silica template decreases.

According to still another embodiment, zirconyl chloride octahydrate ($ZrOCl_2 \cdot 8H_2O$) may be further added to the hydrothermal reaction together with the acid. In this case, the resultant mesoporous silica template may have a flat plate-like shape.

According to still another embodiment, the mesoporous silica template may have a mesopore length controlled by adjusting the concentration of acid and that of zirconyl chloride octahydrate.

According to still another embodiment, step (b) may be carried out through polymerization and carbonization to replicate the mesoporous silica template, thereby forming the mesoporous carbon structures.

According to still another embodiment, the carbon precursor used in step (b) to form the mesoporous carbon structures may include phenol and paraformaldehyde, and phenol and paraformaldehyde may be present in the carbon precursor at a mixing molar ratio of 1:0.5-2.0.

According to yet another embodiment, step (c) may be carried out by using an etchant solution to remove the silica template, wherein the etchant solution may be 1.0-5.0M aqueous sodium hydroxide solution or 30-50 wt % aqueous hydrofluoric acid solution.

The mesoporous carbon structures disclosed herein have a high surface area, large pore volume and pore size, and excellent mass transferability. Thus, the mesoporous carbon structures provide a lithium secondary battery with high lithium ion storability and excellent charge/discharge efficiency.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF EMBODIMENTS

Figure 1:
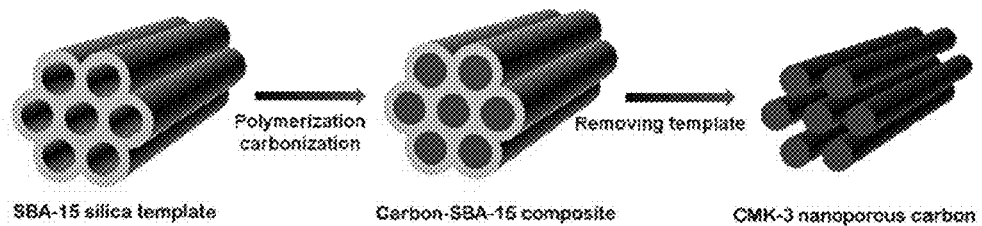
FIG. 1 is a schematic view illustrating the process for preparing rod-like mesoporous carbon structures according to an embodiment.

The advantages, features and aspects of the present disclosure will become apparent from the following description of the embodiments.

In one aspect, there are provided porous carbon structures that may be used as an anode active material for a lithium secondary battery. The porous carbon structures have a high surface area, large pore volume and pore size, and excellent mass transferability, and thus improve the lithium ion storage capacity of a lithium ion secondary battery and allow a lithium ion secondary battery to maintain its capacity after repeating charge/discharge cycles.

In general, an anode active material for a lithium secondary battery includes carbon, and lithium ions continuously move between one layer of such carbon structures and another layer thereof, while allowing charge/discharge of a lithium secondary battery. However, such repeated charge/discharge causes gradual degradation of the anode active material for a lithium secondary battery.

The mesoporous carbon structures disclosed herein may not deteriorate the lithium ion storability of a lithium secondary battery despite repeated charge/discharge cycles of the lithium secondary battery. In addition, the mesoporous carbon structures have a high surface area, large pore volume and size and excellent mass transferability, and thus allow a lithium secondary battery to maintain its capacity for a long time.

The mesoporous carbon structures disclosed herein include a plurality of linear fibrous carbon structures ordered in a polygonal array, wherein pores are formed among the linear fibrous carbon structures while being spaced apart from each other by 1.0-50 nm, and the pores are three-dimensionally interconnected.

The silica template required for preparing the mesoporous carbon structure is prepared through a hydrothermal reaction. When no acid is used during the preparation, the resultant template has no defined shape, and thus becomes amorphous. When using an acid, such as hydrochloric acid, sulfuric acid, nitric acid or phosphoric acid, the resultant template has a rod-like shape. In addition, when zirconyl chloride octahydrate ($ZrOCl_2 \cdot 8H_2O$) is further added as a reactant together with the acid, it is possible to obtain a flat plate-like mesoporous silica template.

In the case of a rod-like and plate-like mesoporous carbon structures, it is possible to obtain more improved lithium ion storability and charge/discharge efficiency. In the case of an amorphous mesoporous carbon structures, it is possible to accomplish improved lithium ion storability and charge/discharge efficiency as compared to the graphite structure according to the related art.

There is no particular limitation in the polygonal array, as long as it allows formation of the mesoporous carbon structures disclosed herein. The polygonal array may have a hexagonal shape. In addition, there is no particular limitation in the number of linear fibrous carbon structures, as long as it allows formation of polygonal mesoporous carbon structures.

When the linear fibrous carbon structures are spaced apart from each other by a distance less than 1.0 nm, an excessively small pore size and volume are obtained undesirably. On the other hand, when the linear fibrous carbon structures are spaced apart from each other by a distance more than 50 nm, it is not possible to form the mesoporous carbon structures stably.

There is no particular limitation in the type of three-dimensional interconnection of the pores, as long as it allows formation of mesoporous carbon structures and provides a large pore volume and pore size. However, the linear fibrous carbon structures may be interconnected in such a manner that they form a polygonal array.

There is no particular limitation in the diameter of the linear fibrous carbon structures in the mesoporous carbon structures, as long as it allows formation of mesoporous carbon structures. However, the linear fibrous carbon structures may be formed within a diameter range (1.0-50 nm) of the silica template used in preparing the mesoporous carbon structures disclosed herein.

When the cylindrical channels of the silica template have a diameter less than 1.0 nm, it is not possible to form mesoporous carbon structures well and to obtain a sufficient effect as carbon structures. On the other hand, when the cylindrical channels of the silica template have a diameter greater than 50 nm, the mesoporous carbon structures to be formed may have a decreased pore size and pore volume.

Micropores smaller than mesopores may also be present in the linear fibrous carbon structures. Although there is no particular limitation in the linear fibrous carbon structures, they may be cylindrical linear carbon structures.

The mesopores of the rod-like mesoporous carbon structures may have a length of 0.1-4.0 µm. When the mesopores of the rod-like mesoporous carbon structures have a length less than 0.1 µm, it is difficult to form the rod-like mesoporous carbon structures stably due to such an excessively small size. When the mesopores of the rod-like mesoporous carbon structures have a length larger than 4.0 µm, the lithium ion storability of a lithium secondary battery is degraded and the charge/discharge efficiency thereof is also lowered.

The surface perpendicular to the mesopores of the rod-like mesoporous carbon structures may have a diameter of 100-2500 nm. When the diameter is less than 100 nm, a lithium ion secondary battery may provide low lithium ion storability and charge/discharge efficiency due to a decreased pore volume and pore size. When the diameter is larger than 2500 nm, it is difficult to form the rod-like mesoporous carbon structures stably.

The mesoporous carbon structures having the above-described characteristics may have a BET surface area of 500-3000 $m^2/g$. When the BET surface area is less than 500 $m^2/g$, it is not possible to provide sufficient lithium ion storability. When the BET surface area is larger than 3000 $m^2/g$, an excessively small pore volume and size may be provided.

In addition, the mesoporous carbon structures have a total pore volume of 0.80-3.80 $cm^3/g$. When the total pore volume is less than 0.80 $cm^3/g$, lithium ion storability and charge/discharge efficiency may be degraded. When the total pore volume is larger than 3.80 $cm^3/g$, it is difficult to form the mesoporous carbon structures stably.

In another aspect, there is provided a method for preparing the mesoporous carbon structures, including the steps of:
(c) providing a plurality of cylindrical channels each having a diameter of 1.0-50 nm and a mesoporous silica template in which the cylindrical channels are ordered in a polygonal array;
(d) forming mesoporous carbon structures by using the mesoporous silica template; and
(c) removing the silica template after forming the mesoporous carbon structures.

The mesoporous silica template includes cylindrical channels to form the mesoporous carbon structures, and the cylindrical channels may have a diameter of 1.0-50 nm.

When providing the mesoporous silica template in step (a), a plurality of cylindrical channels may be formed in the silica template, particularly in a polygonal array.

In step (a), providing the silica template is carried out through a hydrothermal reaction. When an acid is added to the hydrothermal reaction, the resultant mesoporous silica template may have a rod-like shape. In addition, it is possible to control the length of the rod-like silica template by adjusting the concentration of acid.

The acid may be any one selected from the group consisting of hydrochloric acid, sulfuric acid, nitric acid and phosphoric acid. Particularly, the acid may be hydrochloric acid. As the concentration of hydrochloric acid increases, the length of the resultant rods decreases.

In addition, the concentration of acid may be controlled within a range of 0.1-4.0M. When the concentration is less than 0.1M, it is not possible to obtain a sufficient effect. On the other hand, when the concentration is larger than 4.0M, it is not possible to form uniform structures.

When no acid is added during step (a), the resultant mesoporous carbon structures of step (b) becomes amorphous porous carbon structures instead of rod-like carbon structures. Such amorphous mesoporous carbon structures also provide higher lithium ion storability and charge/discharge efficiency as compared to the graphite structure according to the related art.

Further, it is possible to provide a plate-like mesoporous silica template having a more compact structure. Under the conditions of preparing a rod-like mesoporous silica template, zirconyl chloride octahydrate ($ZrOCl_2 \cdot 8H_2O$) is added as reactant, so that the resultant mesoporous silica template may have a flat plate-like shape.

When forming the mesoporous carbon structures in step (b), there is no particular limitation in the carbon precursor as long as it allows formation of linear fibrous carbon structures. However, according to an embodiment, the carbon precursor may include phenol and paraformaldehyde.

In addition, the carbon precursor may be selected from a polymer precursor obtained by polycondensation using an acid catalyst, polymer precursor obtained by polyaddition using an initiator, a mesophase pitch-based carbon precursor, a carbon precursor forming graphitic carbon via carbonization, and a mixture thereof, but is not limited thereto.

Particular examples of the polymer precursor obtained by polycondensation using an acid catalyst, such as sulfuric acid or hydrochloric acid may include phenol, phenol-formaldehyde, furfuryl alcohol, resorcinol-formaldehyde, aldehyde, sucrose, glucose or xylose.

In addition, particular examples of the polymer precursor obtained by polyaddition using an initiator, such as azobisisobutyronitrile, t-butylperacetate, benzoyl peroxide, acetyl peroxide or lauryl peroxide, may include such monomers as divinylbenzene, acrylonitrile, vinyl chloride, vinyl acetate, styrene, methacrylate, methyl methacrylate, ethylene glycol dimethacrylate, urea, melamine, $CH_2=CCR'$ (wherein each of R and R' represents an alkyl group or aryl group).

In step (b), the mesoporous silica carbon structures may be formed through polymerization and carbonization to replicate the mesoporous silica template. Such replication of the silica template through polymerization and carbonization allows the cylindrical channels of the silica template to be filled with carbon structures.

Step (c) may be carried out by removing the silica template by using any material with no particular limitation. Particular examples of such a material include aqueous sodium hydroxide or hydrofluoric acid (HF) solution. The silica template may be removed by introducing aqueous sodium hydroxide solution at a concentration of 1.0-5.0M or aqueous HF solution at a concentration of 20-40 wt %.

When aqueous sodium hydroxide solution is added at a concentration lower than 1.0M or aqueous HF solution is added at a concentration lower than 20 wt %, it is not possible to remove silica sufficiently. On the other hand, when aqueous sodium hydroxide solution is added at a concentration higher than 5.0M or aqueous HF solution is added at a concentration higher than 40 wt %, cost-efficiency is lowered due to such excessive consumption of aqueous sodium hydroxide or HF solution.

The mesoporous carbon structures according to an embodiment are obtained by using silica-based SBA-15, or mesoporous silica having a spherical shape or other various shapes with randomly arranged pores as a template, and using a phenol/paraformaldehyde resin as a carbon precursor, through a nanocasting method.

EXAMPLES

The examples and experiments will now be described. The following examples and experiments are for illustrative purposes only and not intended to limit the scope of this disclosure.

Example 1

The mesoporous carbon structure in this example is obtained by using silica-based mesoporous SBA-15 as a template structure and a phenol/paraformaldehyde resin as a carbon precursor through a nanocasting method.

The template structure is a mesoporous silica structure having a rod-like shape. The rod-like SBA-15 prepared by adjusting concentration of hydrochloric acid during the formation thereof through a hydrothermal reaction and having a different length is used as a template in Examples.

Herein, concentration of hydrochloric acid determines the length of the resultant porous carbon structure. In Example 1, concentration of hydrochloric acid is adjusted in such a manner that the length of mesopores of the finished porous carbon structures is 0.4-1.0 μm.

A typical process for preparing the porous carbon structures disclosed herein is shown in FIG. 1. The process shown in FIG. 1 includes culture of a carbon precursor, polymerization, carbonization and removal of SBA-15 used as a template.

Particularly, a silica template used as a template includes 1.0 g of SBA-15 heated to 100° C. for 12 hours under vacuum and containing 0.375 g of phenol introduced thereto. The mixture of phenol with SBA-15 is allowed to react with 0.238 g of paraformaldehyde at 130° C. for 24 hours under vacuum, thereby producing a mixture of phenol/paraformaldehyde resin with SBA-15.

The mixture is heated to 160° C. at a rate of 1° C./min, and then maintained under nitrogen atmosphere for 5 hours. Then, the temperature is increased to 950° C. at a rate of 5° C./min, and is maintained at this temperature for 7 hours to carbonize the phenol resin crosslinked in the mesopores of SBA-15 structure. After the carbonization, the SBA-15 template is removed by using 3.0M NaOH. To obtain pure porous carbon structures from which silica is removed completely, washing is carried out with aqueous solution containing ethanol and water mixed at a volume ratio of 1:1, thereby finishing porous carbon structures.

The mesoporous carbon structures according to Example 1 have the smallest length among the rod-like carbon structures of Examples 1 to 3. The mesoporous carbon structures are used as an anode active material to obtain a lithium secondary battery.

Example 2

Mesoporous carbon structures are obtained in the same manner as Example 1, except that a mesoporous silica template prepared by adjusting concentration of hydrochloric acid in such a manner that the length of mesopores of the finished mesoporous carbon structures is 0.8-1.6 μm.

The mesoporous carbon structures according to Example 2 have the medium length among Examples 1 to 3. The mesoporous carbon structures are used as an anode active material to obtain a lithium secondary battery.

Example 3

Mesoporous carbon structures are obtained in the same manner as Example 1, except that a mesoporous silica template prepared by adjusting concentration of hydrochloric acid in such a manner that the length of mesopores of the finished mesoporous carbon structures is 1.6-4.0 μm.

The mesoporous carbon structures according to Example 3 have the largest length among Examples 1 to 3. The mesoporous carbon structures are used as an anode active material to obtain a lithium secondary battery.

Example 4

Mesoporous carbon structures are obtained in the same manner as Example 1, except that a plate-like SBA-15 mesoporous silica template prepared by further adding zirconyl chloride octahydrate ($ZrOCl_2 \cdot 8H_2O$) as reactant during the hydrothermal reaction is used instead of the rod-like mesoporous silica template used in Examples 1 to 3.

The mesoporous carbon structures according to Example 4 have a significantly smaller mesopore length as compared to the mesopore length of the rod-like structures of Examples 1 to 3. The mesoporous carbon structures are used as an anode active material to obtain a lithium secondary battery.

Comparative Example

A lithium secondary battery is provided in the same manner as Example 1, except that graphite is used as an anode active material instead of the mesoporous carbon structures of Example 1.

Test Example 1

Each of the mesoporous carbon structures according to Example 1, Example 2, Example 3 and Example 4 is observed in terms of the surface shape and structure through scanning electron microscopy (SEM) and transmission electron microscopy (TEM).

The SEM image is obtained by using a microscope, Hitachi S-4700, operated under the application of a voltage of 10 kV. In addition, TEM analysis is carried out by a transmission electron microscope, EM 912 Omega, operated at 120 kV. Further, nitrogen adsorption isotherms are determined by KICT SPA-3000 Gas Adsorption Analyzer at 77K. Before determination, each sample is subjected to degassing under the conditions of 20 μTorr and 150° C. for 12 hours.

The Brumauer-Emmett-Teller (BET) method is used to determine surface areas ($S_{BET}$). The total pore volume ($V_{total}$) is determined as the amount of gas adsorbed under a relative pressure of 0.99, and the mesopore volume ($V_{MESO}$) and micropore volume ($V_{MICRO}$) are calculated from the analysis of adsorption isotherms by using the Horvath-Kawazoe (HK) method. The pore size distribution (PSD) is derived from the adsorption distribution curve by using the Barrett-Joyner-Halenda (BJH) method. The results are shown in Table 1.

TABLE 1

| | $S_{BET}$ (m²/g) | $V_{micro}$ (cm³/g) | $V_{meso}$ (cm³/g) | $V_{total}$ (cm³/g) | Pore size (nm) |
|---|---|---|---|---|---|
| Ex. 3 | 711 | 0.4 | 0.7 | 1.1 | 3.2 |
| Ex. 2 | 1022 | 0.5 | 0.9 | 1.4 | 3.3 |
| Ex. 1 | 1220 | 0.5 | 1.1 | 1.6 | 3.3 |
| Ex. 4 | 1672 | 1.2 | 1.7 | 2.9 | 3.3 |

Figure 2:
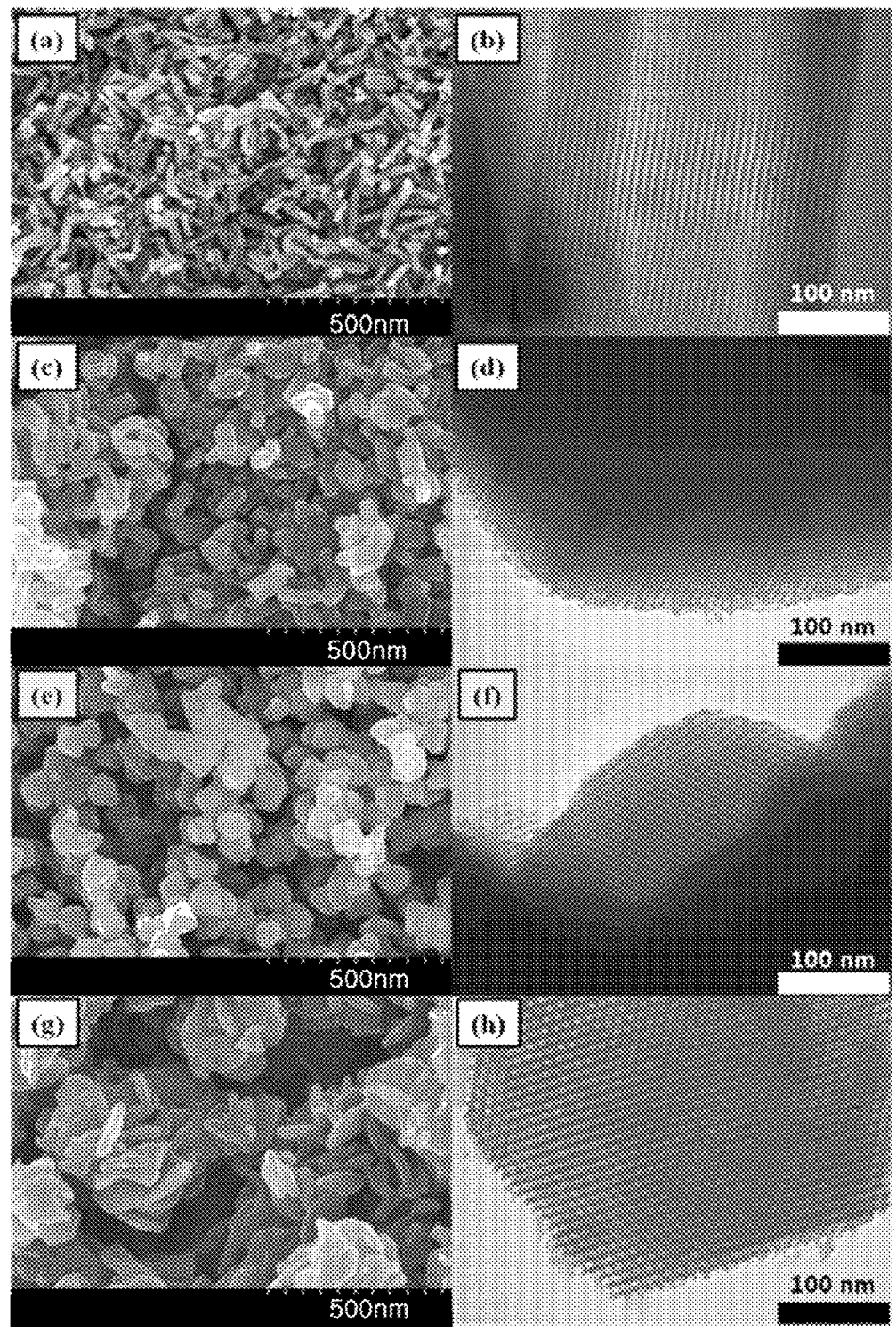
FIG. 2 is a photographic view showing the scanning electron microscopy (SEM) image and high-resolution transmission electron microscopy (HR-TEM) image of Examples 1-4.

In addition, FIG. 2 is a photographic view showing the scanning electron microscopy (SEM) images and transmission electron microscopy (TEM) images of Examples 1-4. In FIG. 2, portion (a) shows the typical SEM image of the mesoporous carbon structures according to Example 3, portion (c) shows that of the mesoporous carbon structures according to Example 2, and portions (e) and (g) show SEM images of the mesoporous carbon structures according to Example 1 and Example 4, respectively. Each of the mesoporous carbon structures retains the structural shape converted from the corresponding silica template, SBA-15.

As shown in portion (a) of FIG. 2, Example 3 provides mesoporous carbon structures that have a mesopore length of about 1.8 μm and a diameter of the surface perpendicular to mesopores up to 0.3 μm. Portion (c) of FIG. 2 is an SEM image of Example 2 having a mesopore length of 1.0 pm and a diameter of the surface perpendicular to mesopores of 0.6 μm. In addition, portion (e) of FIG. 2 shows the mesoporous carbon structures according to Example 1, which have a mesopore length decreased as compared to Examples 2 and 3 to such a degree that the mesopores have a nearly spherical shape, and a diameter of about 600 nm. Further, portion (g) of FIG. 2 shows the mesoporous carbon structures according to Example 4, which have a significantly decreased length and an increased size of surface perpendicular to mesopores, as compared to Example 1. Thus, the mesoporous carbon structures according to Example 4 have a hexagonal prism-like plate structure, in which short carbon wires are grown along the vertical direction, a uniform mesopore length (lateral surface thickness) of about 100-300 nm and a flat surface length of about 1200-1500 nm are observed. Examples 1 to 3 having a rod-like shape are affected by the size of a rod-like SBA-15 silica template controlled by adjusting concentration of hydrochloric acid. The mesoporous carbon structures of Example 4 having a plate structure with a hexagonal prism-like shape also have a shape and size determined by the shape and size of a plate-like SBA-15 silica template.

Portion (b) of FIG. 2 shows a high-resolution transmission electron microscopy (HR-TEM) image of the mesoporous carbon structures according to Example 3. Portion (d) shows an HR-TEM image of the mesoporous carbon structures according to Example 2. In addition, portions (f) and (h) of FIG. 2 show HR-TEM images of the mesoporous carbon structures according to Examples 1 and 4, respectively. It can be seen from the HR-TEM images that mesopores are formed well regularly.

Figure 3:
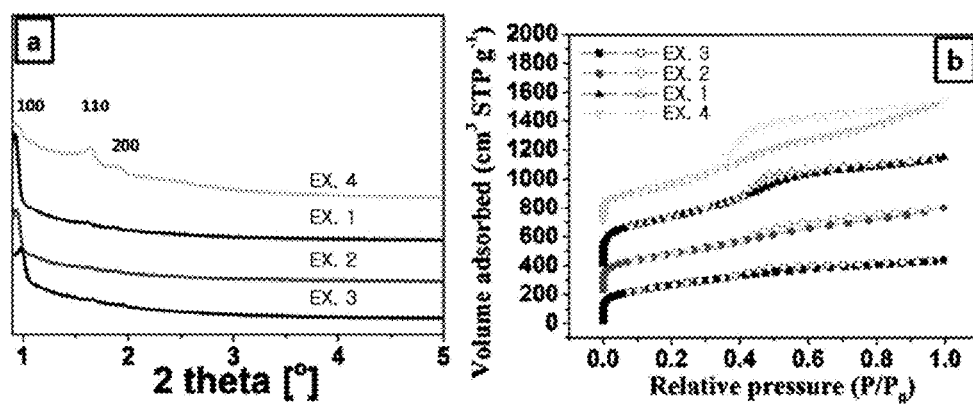
FIG. 3 is a graph showing the small angle X-ray (SAX) pattern (FIG. 3a) and nitrogen adsorption-desorption isotherm (FIG. 3b)

Meanwhile, portion (a) of FIG. 3 shows the small angle X-ray (SAX) patterns according to Examples 1 to 4. Each of the peaks is related to 100, 110 and 200 based on a hexagonal symmetric structure. This conforms to the mesoporous structures as shown in the TEM image of FIG. 2. The strong (100) signals observed in Examples 3, 2, 1 and 4 demonstrate that each mesoporous carbon structure retains its mesoporous structure even after carbonization and removal of silica. However, XRD signals have no significant intensity, suggesting that the mesoporous structure of carbon structures may be broken partially.

Meanwhile, the surface area and pore structure of each of the porous carbon structures are analyzed by a nitrogen adsorption analysis system. In portion (b) of FIG. 3, each of the porous carbon structures shows Type IV adsorption characteristics along with an H4 type hysteresis loop, which demonstrates that each has typical mesopores. Type-IV sorption isotherms are characteristics unique to mesoporous materials, and the hysteresis is caused by capillary condensation of nitrogen inside the pores. It is thought that the generation of a type-H4 hysteresis loop results from the elongated pores observed by the HR-TEM image of the porous carbon structures according to examples. In addition, the BET surface area, pore volume and pore size distribution (PSD) of each of the porous carbon structures are shown in Table 1. Examples 1, 2, 3 and 4 have a surface area of 1220, 1022, 711 and 1672 m²/g. In addition, Example 4 and Example 1 (having the smallest length as a plate-like and rod-like structure, respectively) show the largest surface area ($S_{BET}$, 1672 and 1220 m²/g), total pore volume ($V_{total}$, 2.9 and 1.6 cm³/g) and pore size (3.3 nm). Based on this, it is thought that as the length of porous carbon structures decreases, the surface area and pore volume thereof increase. This conforms to the results of SEM and TEM images of FIG. 2 as well as the SAX patterns of portion (a) of FIG. 3. It is expected that such an increased surface area and pore volume provide improved lithium ion storage capacity. Meanwhile, the unique nanostructure based on a small mesopore length and large pore size facilitates transfer of lithium ions and electrolyte ions while improving storage capacity in the mesoporous and microporous structures. Particularly, the plate-like mesoporous carbon structures according to Example 4 have the shortest mesopores along with a large surface area and pore volume, which is favorable to storage capacity and mass transfer.

Test Example 2

Comparison of Charge/Discharge Efficiency and Lithium Ion Storage Capacity

Example 1, Example 2, Example 3, Example 4 and Comparative Example are compared with each other in terms of charge/discharge efficiency and capacity.

Figure 4:
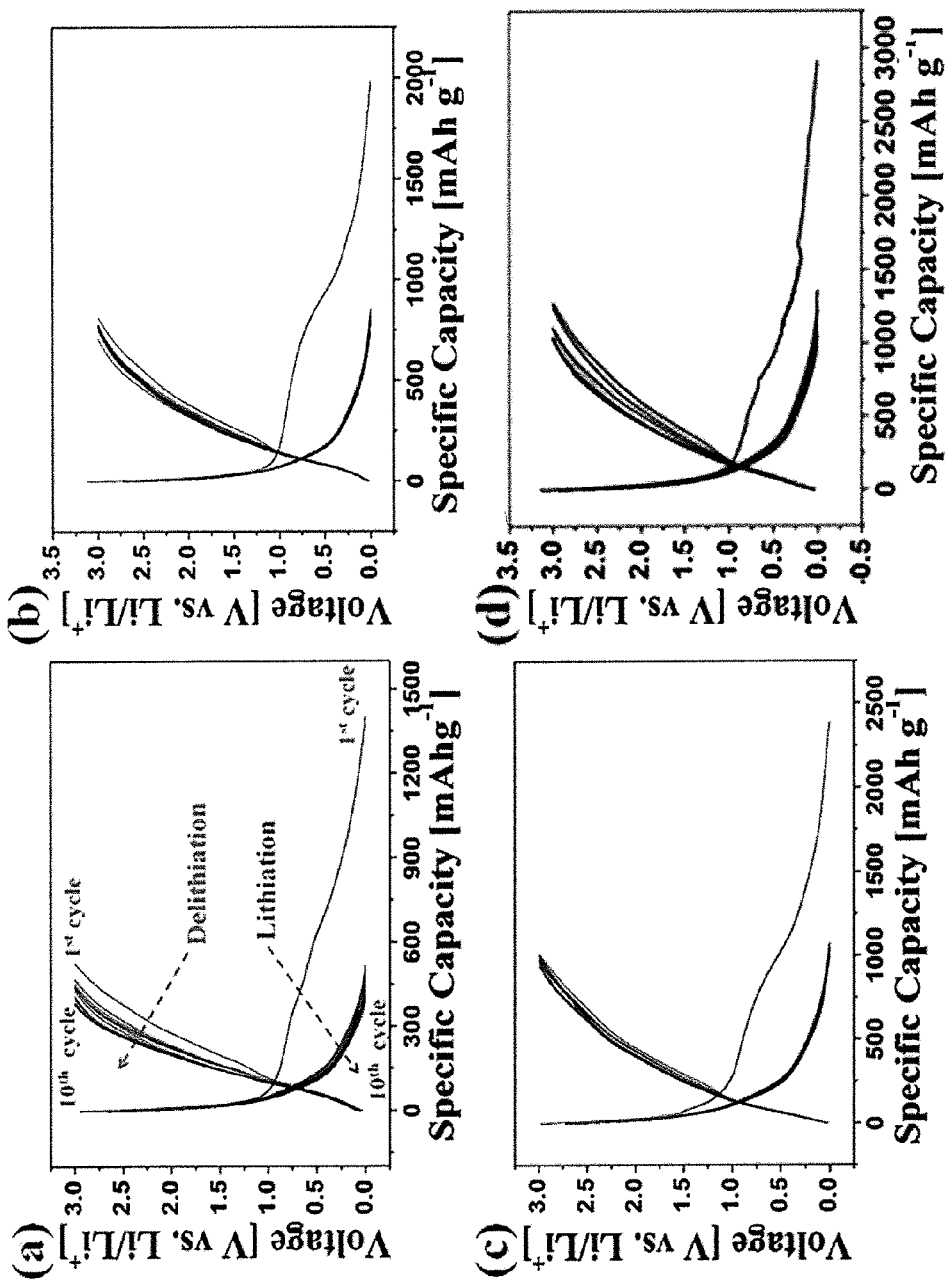
FIG. 4 is a graph showing the galvanostatic charge/discharge curve for the first 10 cycles at 100 mA/g in Examples 1-4.

FIG. 4 shows the galvanostatic charge/discharge curve of each Example in a potential window from 0.01V to 3.0V at a constant current of 100 mA/g. It can be seen from the graph that the first charge capacity is very high in each Example. In other words, the above Examples provide a discharge capacity of 1012, 815, 526 and 1250 mAh/g and an irreversible capacity loss of 58, 59, 63 and 56%. It is thought that such results are derived from improvement in the formation of a solid electrolyte interface (SEI) layer. At the first cycle, the coulombic efficiency of each example is 42.4% (Example 1), 41.1% (Example 2), 37.5% (Example 3), and 44.0% (Example 4). On the other hand, at the second cycle, the coulombic efficiency increases to 90.4% (Example 1), 89.9% (Example 2), 90.8% (Example 3), and 90.0% (Example 4). The efficiency further increases to 95% at the $10^{th}$ cycle and to 98% at the $30^{th}$ cycle.

Figure 5:
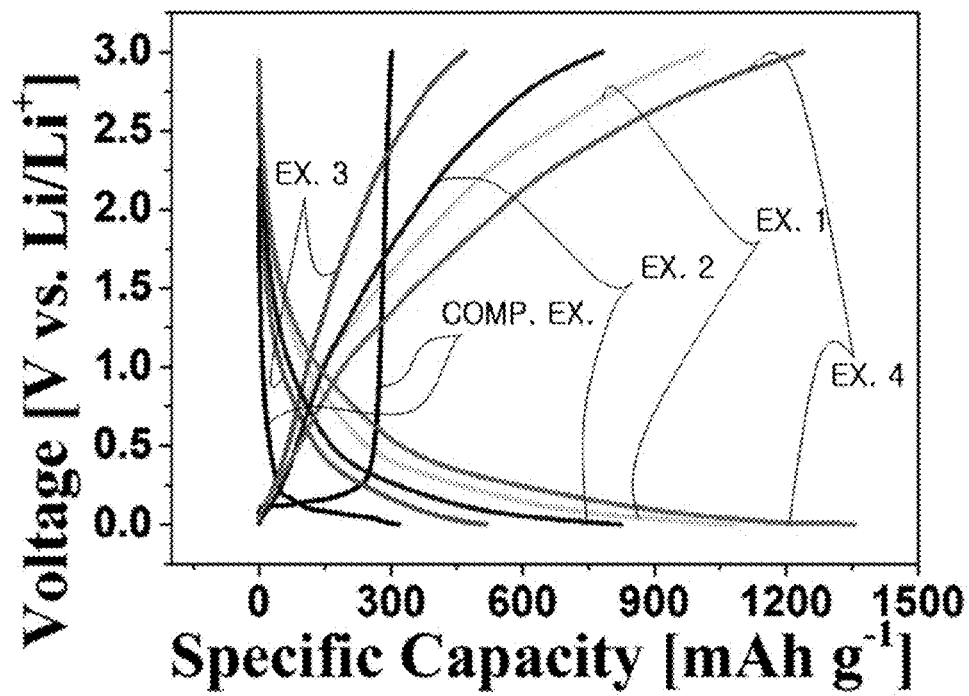
FIG. 5 is a graph showing the galvanostatic charge/discharge curve for the second cycle at 100 mA/g in Examples 1-4 and Comparative Example.

After comparing each of Examples 1, 2, 3 and 4 with Comparative Example, the results of FIG. 5 shows that each Example provides a higher increase in capacity at each voltage as compared to Comparative Example. This demonstrates that when using the mesoporous carbon structures disclosed herein as an anode active material for a lithium secondary battery, it is possible to obtain higher lithium ion storage capacity as compared to a lithium secondary battery using the conventional carbonaceous material (Comparative Example) as an anode active material.

Figure 6:
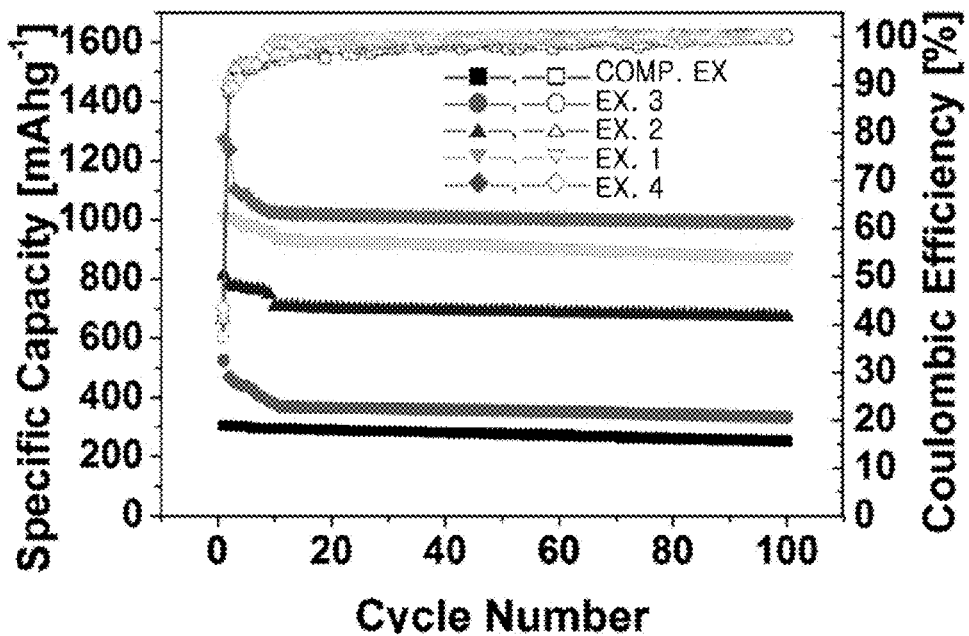
FIG. 6 is a graph illustrating the cycle characteristics and coulombic efficiency at 100 mA/g in Examples 1-4 and Comparative Example.

In addition, it can be seen from FIG. 6 that Examples 1 to 4 provide higher capacity and efficiency as compared to Comparative Example even after repeating charge/discharge cycles. Particularly, as shown in FIG. 6, Examples 1 and 4 provide an efficiency of approximately 100%. This suggests that the mesoporous carbon structures disclosed herein are anode active materials for a lithium secondary battery having excellent capacity and efficiency.

Figure 7:
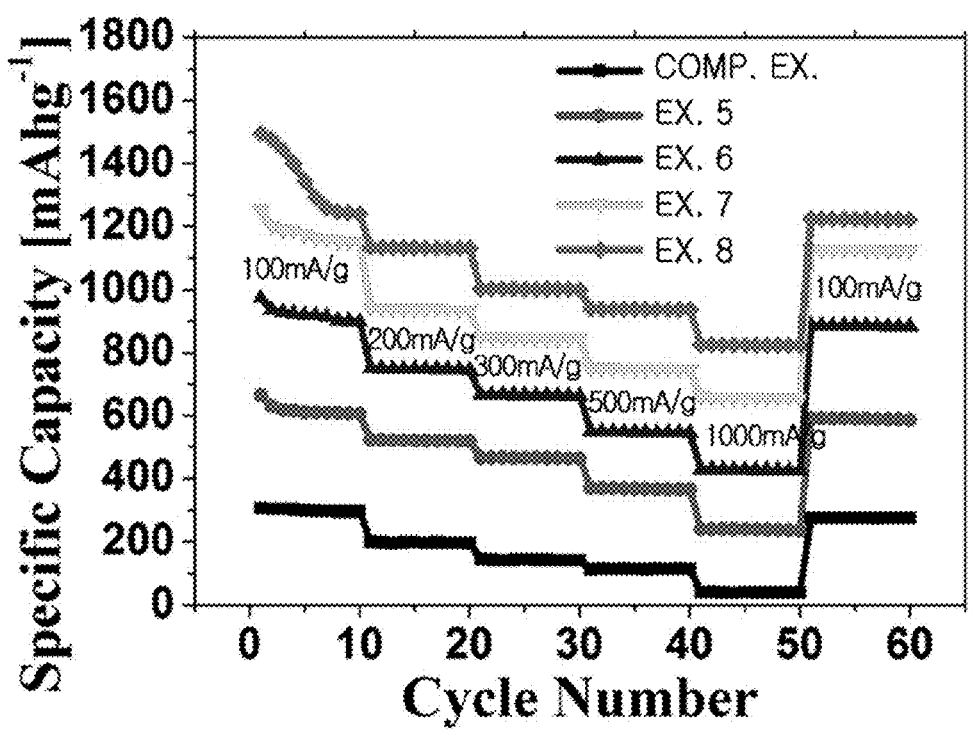
FIG. 7 is a graph illustrating the rate characteristics of Examples 1-4 and Comparative Example from 100 mA/g to 1000 mA/g and after returning to 100 mA/g.

In addition, FIG. 7 is a graph illustrating the rate characteristics of Examples 1-4 and Comparative Example from 100 mA/g to 1000 mA/g and after returning to 100 mA/g to determine restorability of capacity. As compared to Comparative Example, Examples 1 to 4 restore their capacities with no significant capacity loss at 100 mA/g. Particularly, Examples 1 and 4 still provide significantly higher capacity as compared to Comparative Example. This demonstrates that the mesoporous carbon structures disclosed herein may be used as an improved anode active material for a lithium secondary battery having excellent lithium ion storability.

Further, resistance characteristics of Examples are analyzed through Nyquist plots. The following Table 2 shows measurements related to the contact resistance of each Example. Particularly, $R_{SEI}$ means SEI resistance, $R_{ct}$ means charge transfer resistance, and ZW means Warburg impedance. As can be seen from Table 2, Examples 1 and 4 show the lowest resistance. This demonstrates that the mesoporous carbon structures of Examples 1 and 4 facilitate transfer of lithium ions and electrolyte ions, and thus function as an improved anode active material. It is thought that the lowest resistance of Example 4 is caused by a large average pore size of 3.3 nm, a large pore volume and surface area and a small mesopore length, thereby facilitating mass transfer.

TABLE 2

|  | $R_{SEI}$/Ohm | $R_{ct}$/Ohm | $Z_W$/Ohm |
| --- | --- | --- | --- |
| Ex. 3 | 44.7 | 39.7 | 65.8 |
| Ex. 2 | 25.6 | 25.0 | 43.2 |
| Ex. 1 | 19.6 | 15.8 | 12.4 |
| Ex. 4 | 14.5 | 9.4 | 8.7 |

As can be seen from the above results, Examples 1 to 4 are better than Comparative Example as an anode active material for a lithium secondary battery. Particularly, Examples 1 to 4 have higher lithium ion storage capacity, cycle characteristics and rate capacity as compared to Comparative Example. In addition, Example 4, in particular, has the smallest mesopore length together with a large specific surface area and large pore volume, shows high charge/discharge capacity and facilitates mass transfer, and thus is the mesoporous carbon structure with the highest quality. Therefore, when using each mesoporous carbon structure according to Examples 1 to 4 as an anode active material for a lithium secondary battery, it is possible to obtain a lithium secondary battery having high lithium ion storability, high charge/discharge efficiency and excellent capacity maintenance.

While the present disclosure has been described with respect to the specific embodiments, it will be apparent to those skilled in the art that various changes and modifications may be made without departing from the spirit and scope of the disclosure as defined in the following claims.

What is claimed is:

1. Mesoporous carbon structures comprising a plurality of linear fibrous carbon structures ordered in a polygonal array, wherein pores are formed among the linear fibrous carbon structures while being spaced apart from each other by 1.0-50 nm, and the pores are three-dimensionally interconnected, wherein the mesoporous carbon structures have a plate-like shape, wherein the plate-like shape defines a first surface and a second surface defining a surface thickness therebetween of 100-300 nm, wherein the first surface and the second surface each define a surface length of 1200-1500 nm, wherein the linear fibrous carbon structures extend between the first surface and the second surface in a direction of the surface thickness, and wherein the mesoporous carbon structures are formed by a silica template formed with a hydrothermal reaction using an acid and zirconyl chloride octahydrate ($ZrOCl_2 \cdot 8H_2O$).

2. The mesoporous carbon structures according to claim 1, which have a length of 0.1-4.0 μm, diameter of 100-2500 nm, and a BET surface area of 500-3000 $m^2/g$.

3. The mesoporous carbon structures according to claim 1, which have a total pore volume of 0.80-3.80 $cm^3/g$.

4. A method for preparing mesoporous carbon structures, comprising the steps of:
(a) providing a plurality of cylindrical channels each having a diameter of 1.0-50 nm and a mesoporous silica template in which the cylindrical channels are ordered in a polygonal array;
(b) forming mesoporous carbon structures by using the mesoporous silica template; and (c) removing the silica template after forming the mesoporous carbon structures,
wherein step (a) is carried out through a hydrothermal reaction,
wherein an acid and zirconyl chloride octahydrate (ZrOC, $l_2 \cdot 8H_2O$) are added to the hydrothermal reaction to define the silica template having a plate-like shape,
wherein the mesoporous carbon structures define a plurality of linear fibrous carbon structures ordered in a polygonal array,
wherein pores are formed among the linear fibrous carbon structures while being spaced apart from each other by 1.0-50 nm, and the pores are three-dimensionally interconnected,
wherein the mesoporous carbon structures have a plate-like shape
wherein the plate-like shape of the mesoporous carbon structures defines a first surface and a second surface defining a surface thickness therebetween of 100-300 nm,
wherein the first surface and the second surface each define a surface length of 1200-1500 nm, and
wherein the linear fibrous carbon structures extend between the first surface and the second surface in a direction of the surface thickness.

5. The method for preparing mesoporous carbon structures according to claim 4, wherein the acid is any one selected from the group consisting of hydrochloric acid, sulfuric acid, nitric acid and phosphoric acid, and the mesoporous silica template has a mesopore length controlled by adjusting the concentration of acid.

6. The method for preparing mesoporous carbon structures according to claim 5, wherein the concentration of acid is controlled within a range of 0.1-4.0 M, and the length of the resultant rod-like mesoporous silica template decreases as the concentration of acid increases.

7. The method for preparing mesoporous carbon structures according to claim 4, wherein the mesoporous silica template has a mesopore length controlled by adjusting the concentration of acid and that of zirconyl chloride octahydrate.

8. The method for preparing mesoporous carbon structures according to claim 4, wherein step (b) is carried out through polymerization and carbonization to replicate the mesoporous silica template, thereby forming the mesoporous carbon structures.

9. The method for preparing mesoporous carbon structures according to claim 4, wherein the carbon precursor used in step (b) to form the mesoporous carbon structure comprises phenol and paraformaldehyde.

10. The method for preparing mesoporous carbon structures according to claim 9, wherein phenol and paraformaldehyde are present in the carbon precursor at a mixing molar ratio of 1:0.5-2.0.

11. The method for preparing mesoporous carbon structures according to claim 4, wherein step (c) is carried out by using an etchant solution to remove the silica template, and the etchant solution is 1.0-5.0M aqueous sodium hydroxide solution or 30-50 wt% aqueous hydrofluoric acid solution.

12. An anode active material for a lithium secondary battery comprising the mesoporous carbon structures as defined in claim 1.

13. A lithium secondary battery comprising the anode active material as defined in claim 12.

* * * * *